(12) United States Patent
Senbongi et al.

(10) Patent No.: US 7,123,677 B2
(45) Date of Patent: Oct. 17, 2006

(54) VARIABLE SAMPLING DATA OUTPUT CIRCUIT

(75) Inventors: Toru Senbongi, Yokohama (JP);
Kentaro Murayama, Kawasaki (JP);
Makio Kondo, Yokohama (JP)

(73) Assignee: Freescale Semiconductor, INC, Austin, TX (US)

( * ) Notice: Subject to any disclaimer, the term of this patent is extended or adjusted under 35 U.S.C. 154(b) by 668 days.

(21) Appl. No.: 10/236,377

(22) Filed: Sep. 5, 2002

(65) Prior Publication Data

US 2003/0063692 A1    Apr. 3, 2003

(30) Foreign Application Priority Data

Sep. 28, 2001 (JP) ............................. 2001-300556

(51) Int. Cl.
*H04L 25/00* (2006.01)
*H04L 7/00* (2006.01)
*H04L 3/24* (2006.01)
*H04L 27/06* (2006.01)

(52) U.S. Cl. ...................... 375/371; 375/355; 375/373; 375/340

(58) Field of Classification Search ................ 375/377, 375/371, 354, 355, 373, 340, 359, 360; 377/354; 370/503, 516; 340/870.25; 341/100, 101; 327/50, 91

See application file for complete search history.

(56) References Cited

U.S. PATENT DOCUMENTS 6,363,175 B1 * 3/2002 Scheirer et al. ............. 382/232
6,510,182 B1 * 1/2003 Lee et al. .................... 375/259
6,888,888 B1 * 5/2005 Tu et al. ................. 375/240.01

* cited by examiner

*Primary Examiner*—Tesfaldet Bocure
(74) *Attorney, Agent, or Firm*—Charles Bergere

(57) ABSTRACT

A sampling data output circuit capable of Accommodating frequency variations includes a converter portion for sampling an input data signal (402) at an oversampling frequency to output, in parallel, a plurality of fundamental signal series (p1, p2, p3, p4), a first circular shifter for receiving the plurality of fundamental signal series and outputting a plurality of first frequency shift signal series having a higher frequency than the fundamental sampling frequency, and a second circular shifter for receiving the plurality of fundamental signal series and outputting a plurality of second frequency shift signal series having a lower frequency than the fundamental sampling frequency. The first and second circular shifters create each of the signal series by selecting a signal sample out of the input fundamental signal series according to a count value of a phase shift cumulative counter and a predetermined rule related to the frequency shift.

3 Claims, 3 Drawing Sheets

VARIABLE SAMPLING DATA OUTPUT CIRCUIT

BACKGROUND OF THE INVENTION

The present invention relates in general to data sampling circuits used in the field of data communication, and more specifically to a sampling data output circuit capable of flexibly accommodating frequency variations.

With wireless data communication systems, a signal transmitted over a radio frequency is down-converted to baseband frequency, which is subjected to signal processing, such as sampling, to produce a desired signal. Wireless systems of this type typically include a synchronous system and an asynchronous system. Synchronous systems, which use a preamble synchronization signal to ensure synchronization on the transmitting and receiving ends for phase alignment, suffer a problem in that the period until synchronization is attained (training period) can be very long depending on use, thus resulting in cost disadvantages. On the other hand, asynchronous systems allow for phase adjustment without use of a preamble synchronization signal.

FIG. 1 shows a schematic block diagram of a sampling data output circuit (100) used in such an asynchronous system. The circuit (100) comprises an oversampling portion (104) that receives an input signal (102) and samples it at an oversampling frequency (CLK4×) that is four times the sampling frequency. The oversampling portion (104) comprises four delay elements (106). An output of each of the delay elements (106) is connected, respectively, to first through fourth phase output portions (112–118) and further connected to an error detector (not shown).

FIG. 2 shows a timing chart for explaining the operation of the system (100) shown in FIG. 1. The input signal (102) is first sampled at the oversampling portion (104) and is sequentially stored in the delay elements in alignment with the oversampling clock (CLK4×). The outputs of the delay elements (106) are fed to input portions (110) of the first through fourth phase output portions (112–118), and output from each of the phase output portions in alignment with a sampling clock (CLK). These output signals are signal series that are out of phase from each other, and correspond to versions of the input signal (102) sampled at phase timings as denoted by p1, p2, p3, and p4. After error checking by the error detector (not shown), a desired signal series is selected. Such a system presumes that the sampling clock (CLK) and the oversampling clock (CLK4×), which is a multiplied version thereof, are the same on the transmitting and receiving ends.

However, the frequencies on the transmitting and receiving ends are not necessarily the same due to factors, such as communication apparatus manufacturing variability, changes over time, variations in temperature, and other environmental influences. If the clock or frequency is offset, a problem as described below may occur. For example, if the frequency on the receiving end is higher by 0.5% than that on the transmitting end, the data sampling point is offset by 0.5 samples per 100 samples (100*0.005=0.5 samples), or by one whole sample per 200 samples (see FIG. 2). Thus, if the data length of the packets transmitted is about 100 samples, an offset in the sampling point is 0.5 samples at most; thus, error-free data may be determined by selecting either of the four phase candidates. However, if the packet length is 200 samples or longer, the sampling point is completely offset by one or more samples, so that an error will result even when either of the phase candidates is selected. By reducing the packet length, for example, about 100 samples long in this case, the problem associated with frequency offset may be addressed theoretically. However, the data length to be transmitted is typically very long. Thus, there is a problem in that, with a shorter packet length, the processing required to reconstruct the original long data is complicated.

The present invention solves at least one of the aforedescribed problems.

DETAILED DESCRIPTION OF THE INVENTION

Figure 1:
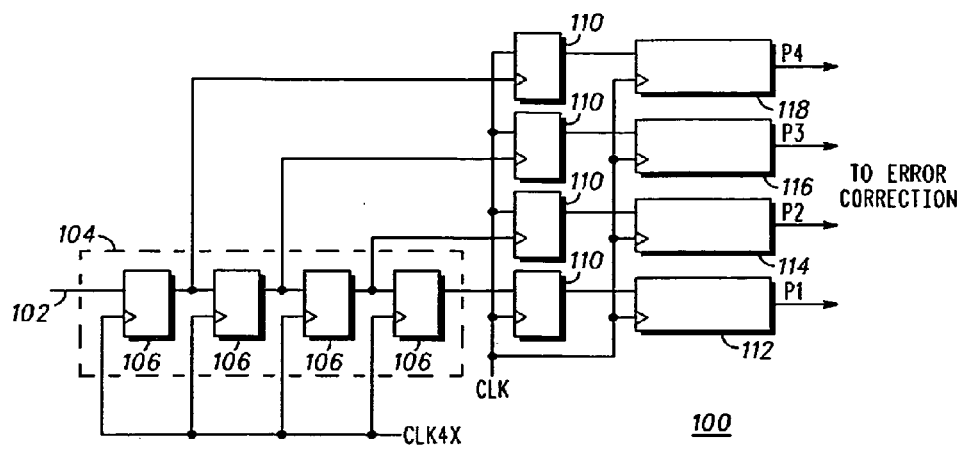
FIG. 1 shows a schematic block diagram of a sampling data output circuit (100) used in a communication system.
Figure 2:
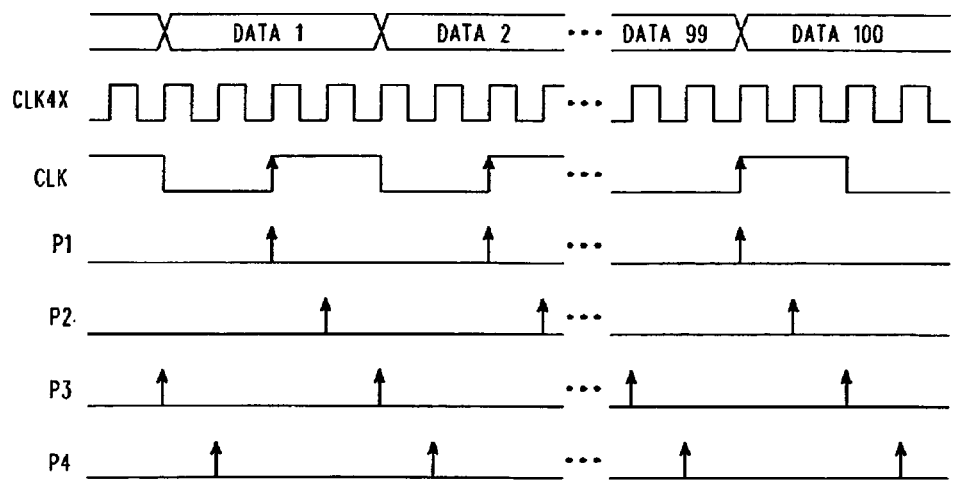
FIG. 2 shows a timing chart for explaining the operation of the system (100) of FIG. 1
Figure 3:
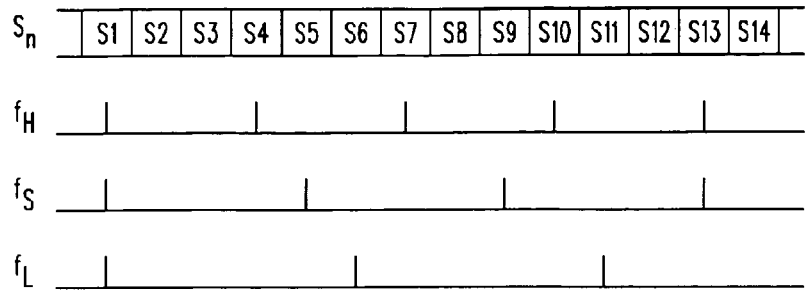
FIG. 3 shows a timing chart describing three sampling timings having different frequencies from each other.

FIG. 3 shows a timing chart describing three sampling timings having different frequencies. The uppermost data series denotes a data series (Sn) obtained by sampling the input signal with an oversampling frequency that is four times a sampling frequency (fs). The contents of the data series (Sn) correspond to those stored in the group of delay elements (106) shown in FIG. 1. Next to the data series (Sn) are shown sampling points at a frequency (fH) higher than the sampling frequency (fs), at the sampling frequency (fs), and at a frequency (fL) lower than the sampling frequency, respectively. In this example, the timing interval for sampling is four oversample periods for the fundamental frequency (fs); three oversample periods for the higher frequency (fH); and five oversample periods for the lower frequency (fL). That is, if sampling is performed at the higher frequency (fH), a signal series consisting of {S1, S4, S7, S10, ... } is obtained; if sampling is performed at the fundamental frequency (fs), a signal series consisting of {S1, S5, S9, S13, ... } is obtained; and if sampling is performed at the lower frequency (fL), a signal series consisting of {S1, S6, S11, ... } is obtained. In other words, if a signal series consisting of {S1, S4, S7, S10, ... } could be determined relative to the oversampled data series {Sn}, it is equivalent to sampling at the higher frequency (fH). Similarly, if a signal series consisting of {S1, S5, S9, S13, ... } could be determined, it is equivalent to sampling at the lower frequency (fl).

Figure 4:
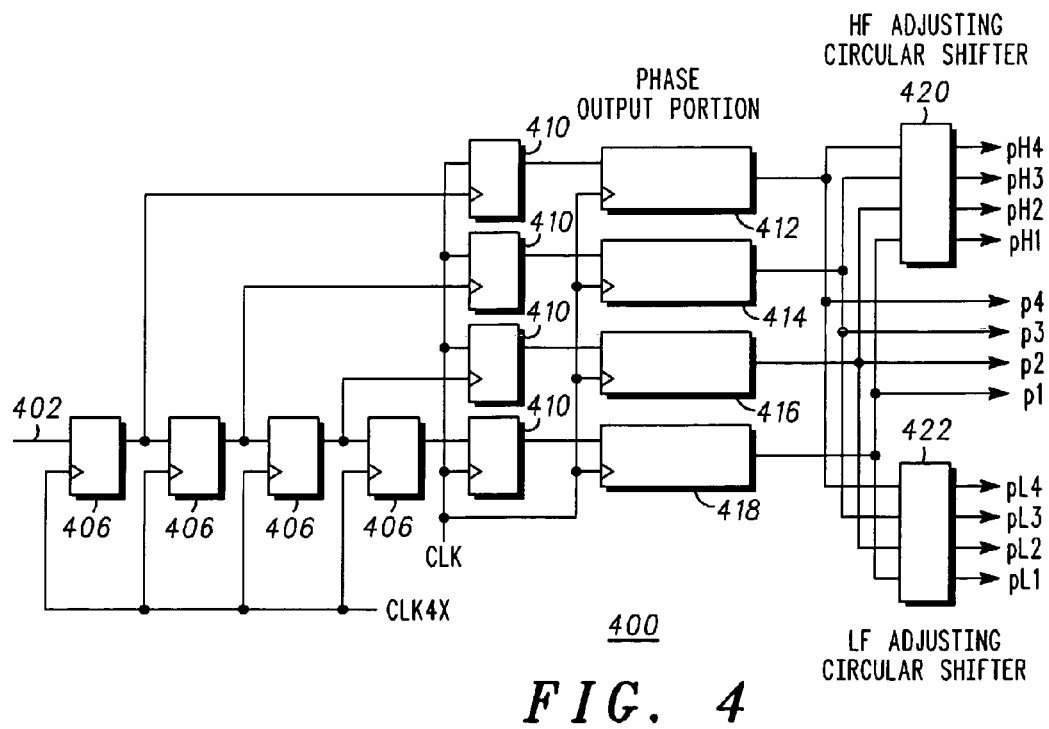
FIG. 4 shows a schematic block diagram of a sampling data output circuit (400) according to the present invention.

FIG. 4 shows a schematic block diagram of a sampling data output circuit (400) according to the present invention. Like elements are referred to by similar reference numerals to those in FIG. 1, except that they start with a 4 instead of a 1. Furthermore, the circuit (400) has a high-frequency adjusting circular shifter (420) and a low-frequency adjusting circular shifter (422), both connected to first through fourth phase output portions (412–418).

An input signal (402) is sampled in alignment with the oversampling clock (CLK4×) and sequentially stored in delay elements (406). Outputs from the delay elements (406) are fed to input portions (410) of the first through fourth phase output portions (412–418), and output from each of the phase output portions in alignment with the sampling clock (CLK). The output signals are signal series {p1}, {p2}, {p3}, {p4} that are out of phase with each other, and are fed to an error detector (not shown). Up to this point, the present invention is similar to the prior art.

The output signals from the first through fourth phase output portions (412–418) are also provided to the high-frequency adjusting circular shifter (420). The circular shifter (420) outputs signal series {pH1}, {pH2}, {pH3}, {pH4} that are obtained by sampling at a higher frequency (fH) than the fundamental frequency (fs) based on the signal series {p1}, {p2}, {p3}, {p4}. When numerical examples used in the description of FIG. 3 are employed, {p1} provides a signal series consisting of {S1, S5, S9, S13, ... }, and {pH1} provides a signal series consisting of {S1, S4, S7, S10, ... }. Other signal series, such as {pH2}, are provided similarly. Furthermore, the output signals from the first through fourth phase output portions (412–418) are provided to the low-frequency adjusting circular shifter (422). The circular shifter (422) outputs signal series {pL1}, {pL2}, {pL3}, {pL4} that are obtained by sampling at a lower frequency (fL) than the fundamental frequency (fs) based on the signal series {p1}, {p2}, {p3}, {p4}. When numerical examples used in the description of FIG. 3 are employed, {pL1} provides a signal series consisting of {S1, S6, S11, S16, ... }. Other signal series, such as {pL2}, are provided similarly. Taking into account the four phase shifts for each of the three frequencies (fs, fH, fL), a total of twelve signal series are obtained. Then, after error checking by an error detector (not shown), a desired signal series is selected.

Figure 5:
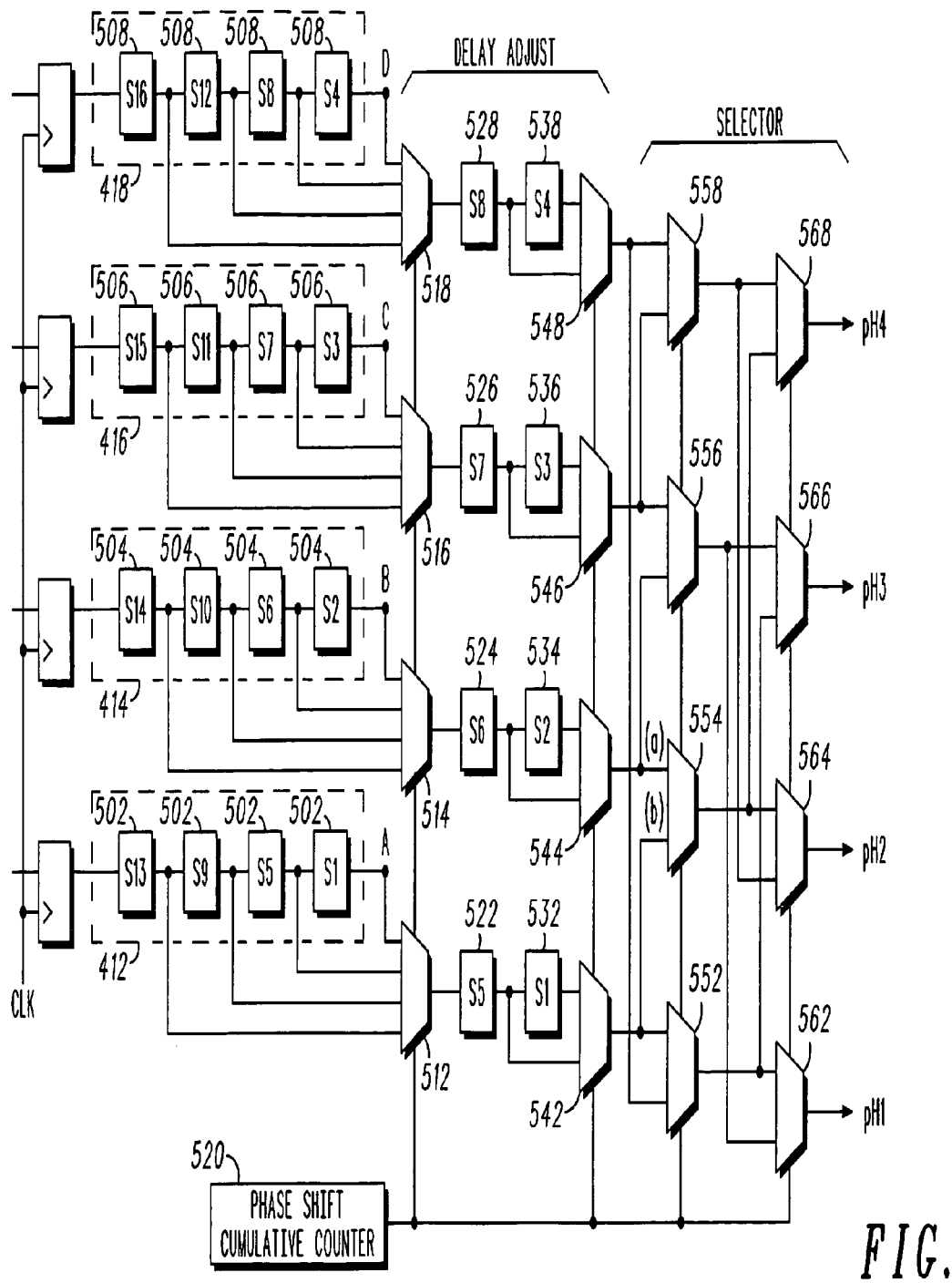
FIG. 5 is a partial block diagram related to principal portions of the sampling data output circuit (400) shown in FIG. 4.

FIG. 5 is a block diagram of portions related mainly to the first through fourth phase output portions (412–418) and high-frequency adjusting circular shifter (420) of the sampling data output circuit (400) shown in FIG. 4. The circular shifter (420) is divided into a portion for adjusting the relative amount of delay for each of the signal series and a selector portion for selecting necessary data. The low-frequency adjusting circular shifter (422) may be configured similarly, and thus is not described herein.

The first phase shift output portion (412) shown at the lower left part of the figure comprises a series of delay elements (502), wherein the output of the rightmost delay element (502) is connected to a first input of a first selector (512) via an output node (A). The outputs of the other delay elements (502) are connected to the second, third, and fourth inputs of the first selector (512), respectively. The output of the first selector (512) is connected to one input (a) of a second selector (542) via a first delay element (522) and a second delay element (532). The output of the first delay element (522) is connected to the other input (b) of the second selector (542). The output of the second selector (542) is connected to one input (a) of a third selector (552). The output of the third selector (552) is connected to one input (a) of a fourth selector (562). The output of the fourth selector (562) provides a signal series {pH1} that is obtained when sampling is performed at a higher frequency (fH) than the fundamental frequency (fs).

Similarly, the output of the rightmost delay element (504) in the second phase output portion (414) is connected to a first input of a first selector (514) via an output node (B). The outputs of the other delay elements (504) are also connected to the second, third, and fourth inputs of the first selector (514), respectively. The output of the first selector (514) is connected to one input (a) of a second selector (544) via a first delay element (524) and a second delay element (534). The output of the first delay element (524) is connected to the other input (b) of the second selector (544). One input (a) of a third selector (554) is connected to the output of the second selector (544), while the other input (b) thereof is connected to the output of the second selector (542) related to the first phase. The output of the third selector (554) is connected to one input (a) of a fourth selector (564). The output of the fourth selector (564) provides a signal series {pH2} that is obtained when sampling is performed at a higher frequency (fH) than the fundamental frequency and is in out-of-phase relationship with the signal series {pH1}.

Similarly, the output of the rightmost delay element (506) in the third phase output portion (416) is connected to a first input of a first selector (516) via an output node (C). The outputs of the other delay elements (506) are also connected to the second, third, and fourth inputs of the first selector (516), respectively. The output of the first selector (516) is connected to one input (a) of a second selector (546) via a first delay element (526) and a second delay element (536). The output of the first delay element (526) is connected to the other input (b) of the second selector (546). One input (a) of a third selector (556) is connected to the output of the second selector (546), while the other input (b) thereof is connected to the output of the second selector (544) related to the second phase. One input (a) of a fourth selector (566) is connected to the output of the third selector (556), while the other input (b) thereof is connected to the output of the third selector (552) related to the first phase. The output of the fourth selector (566) provides a signal series {pH3} that is obtained when sampling is performed at a higher frequency (fH) than the fundamental frequency and is in out-of-phase relationship with the signal series {pH1} and {pH2}.

Additionally, the output of the rightmost delay element (508) in the fourth phase output portion (418) is connected to a first input of a first selector (518) via an output node (D). The outputs of the other delay elements (508) are also connected to the second, third, and fourth inputs of the first selector (518), respectively. The output of the first selector (518) is connected to one input (a) of a second selector (548) via a first delay element (528) and a second delay element (538). The output of the first delay element (528) is connected to the other input (b) of the second selector (548). One input (a) of a third selector (558) is connected to the output of the second selector (548), while the other input (b) thereof is connected to the output of the second selector (546) related to the third phase. The output of the second selector (548) is also connected to the other input (b) of the third selector (552) of the first phase. One input (a) of a fourth selector (568) is connected to the output of the third selector (558), while the other input (b) thereof is connected to the output of the third selector (554) related to the second phase. The output of the fourth selector (568) provides a signal series {pH4} that is obtained when sampling is performed at a higher frequency (fH) than the fundamental frequency and is in out-of-phase relationship with the signal series {pH1}, {pH2}, and {pH3}.

A phase shift cumulative counter (520) is connected to the first selectors (512, 514, 516, 518), second selectors (542, 544, 546, 548), third selectors (552, 554, 556, 558), and fourth selectors (562, 564, 566, 568) related to each of the phases.

Next, the operation is described. In each of the delay elements are sequentially stored the oversampled data (Sn) according to the clock. For example, the signal series {p1} of the first phase is obtained from the output node (A), which, more specifically, consists of S1, S5, S9, S13 in chronological order. For the sample data input in this manner, a desired signal series {pH1}, ..., {pH4} is determined by appropriately selecting each of the selectors according to a count value of the cumulative counter (520) and a predetermined rule related to the frequency shift. For example, the output signal series {pH1} consists of S1, S4, S7, S10, . . . , which is shifted at a ratio of one sample per four oversamples, as compared to the signal series of the fundamental frequency, {p1}=S1, S5, S9, S13, . . . In addition, data such as S4, S7, S10 are not contained in the signal series {p1}, but contained in other signal series {p2}, {p3}, or {p4}. Taking advantage of such a relationship, a desired signal series with different frequencies may be constructed based on the existing signal series {p1} through {p4}. Which phase of data should be selected out of the four phases is determined by selecting the third selectors (552, 554, 556, 558) and fourth selectors (562, 564, 566, 568) as appropriate according to the rule related to the frequency shift. Furthermore, it is the first selectors (512, 514, 516, 518), first delay elements (522, 524, 526, 528), second delay elements (532, 534, 536, 538), and second selectors (542, 544, 546, 548) that adjust the relative amount of delay related to each of the phases among the signal series.

For example, in the example shown, if, at the first clock, the first selectors (512, 514, 516, 518) collectively select the first input and the other two-input selectors collectively select one input (a), then it is S1 that is outputted as the {pH1} data during this period. Similarly, S2, S3, and S4 are outputted for {pH2}, {pH3}, and {pH4}, respectively. At the second clock, if the second selectors (542, 544, 546, 548) select the other input (b), the third selectors (552, 554, 556, 558) also select the other input (b), and the fourth selectors (562, 564, 566, 568) select one input (a), then S4 is outputted for {pH1}; S5 for {pH2}, S6 for {pH3}; and S7 for {pH4}, respectively. At the third clock, if the first selectors (512, 514) selects the second input, S5 is stored in the second delay element (532) of the first phase; S9 in the first delay element; S6 in the second delay element (534) of the second phase; and S10 in the first delay element (524), respectively. In this way, by shifting the signal series of the first and second phases, the amount of delay relative to each of the signal series is adjusted. Furthermore, if the second selectors (542, 544, 546, 548) select the other input (b), the third selectors (552, 554, 556, 558) select one input (a), and the fourth selectors (562, 564, 566, 568) select the other input (b), then S7, S8, S9, and S10 are outputted for {pH1}, {pH2}, {pH3}, and {pH4}, respectively. At the fourth clock, if the first selector (512) of the first phase selects the third input and the first selectors (516, 518) of the third and fourth phases select the second input, then S9 is stored in the second delay element (532); S13 in the first delay element (522); S7 in the second delay element (536); S11 in the first delay element (526); S8 in the second delay element (538); and S12 in the first delay element (528), respectively. In this way, the amount of delay relative to each of the signal series is further adjusted. Additionally, if the other two-input selectors collectively select the other input (b), then S10, S11, S12, and S13 are outputted for {pH1}, {pH2}, {pH3}, and {pH4}, respectively. In this way, when each of the selectors is appropriately selected while appropriately shifting the data samples in alignment with the clock, a desired signal series may be obtained.

According to the present embodiment, not only phase offsets related to the sampling data signal, but also frequency shifts on the transmitting and receiving ends can be accommodated. Thus, the packet length that can be appropriately transmitted may be extended more than can conventionally be done. From the standpoint of obtaining a signal series that is different from the signal series {p1} related to the fundamental frequency (fs), merely providing either the circular shifter (420) or (422) would be enough. However, in order to achieve bi-directional communication acceptably, radio terminals on both ends must be able to accommodate frequency offsets for both high and low frequencies. In this regard, the apparatus of the present embodiment could be very advantageous.

For convenience of explanation, an extreme case has been assumed in the above example where one sample is shifted every four samples, although it should be understood that this is not intended to limit the operating principles of the present embodiment. Specific numerals and other parameters may be selected as appropriate according to the communication environment used. Additionally, a frequency offset that is to be set may be a fixed value or a variable (programmable) value. The type of frequency and phase and the number thereof to be employed may also be selected as appropriate according to the environment used.

FIG. 1
TO ERROR DETECTOR

FIG. 2
INPUT SIGNAL 102
DATA 1
DATA 2
DATA 99
DATA 100

FIG. 5
DELAY AMOUNT ADJUSTMENT
SELECTOR

The invention claimed is:

1. A variable sampling data output circuit comprising:
a converter portion for sampling an input data signal (402) by use of an oversampling frequency to output, in parallel, a plurality of fundamental signal series (p1, p2, p3, p4), wherein each of said plurality of fundamental signal series has the same fundamental sampling frequency (fs) but a different phase; and
a circular shifter for receiving said plurality of fundamental signal series and outputting a plurality of frequency shift signal series (pH1, pH2, pH3, pH4), wherein the frequency common to each of said plurality of frequency shift signal series is different from the fundamental sampling frequency, and each of said plurality of frequency shift signal series has a different phase;
wherein said circular shifter generates the frequency shift signal series by selecting a desired signal sample out of the fundamental signal series according to a count value of a phase shift cumulative counter and a predetermined rule related to the frequency shift; and
wherein a desired signal series is obtained by determining whether there is an error in an error detector in relation to at least one fundamental signal series and at least one frequency shift signal series.

2. A variable sampling data output circuit comprising:
a converter portion for sampling an input data signal (402) by use of an oversampling frequency to output, in parallel, a plurality of fundamental signal series (p1, p2, p3, p4), wherein each of said plurality of fundamental signal series has the same fundamental sampling frequency (fs) but a different phase;
a first circular shifter for receiving said plurality of fundamental signal series and outputting a plurality of first frequency shift signal series (pH1, pH2, pH3, pH4), wherein the frequency common to each of said plurality of first frequency shift signal series is higher than the fundamental sampling frequency, and each of said plurality of first frequency shift signal series has a different phase; and a second circular shifter for receiving said plurality of fundamental signal series and outputting a plurality of second frequency shift signal series (pL1, pL2, pL3, pL4), wherein the frequency common to each of said plurality of second frequency shift signal series is lower than the fundamental sampling frequency, and each of said plurality of second frequency shift signal series has a different phase;

wherein said first and second circular shifters generate the first and second frequency shift signal series by selecting a desired signal sample out of the received fundamental signal series according to a count value from a phase shift cumulative counter and a predetermined rule related to the frequency shift; and wherein a desired signal series is obtained by determining whether there is an error in an error detector in relation to at least one fundamental signal series, at least one first frequency shift signal series, and at least one second frequency shift signal series.

3. A variable sampling data output circuit comprising:

a converter portion for sampling an input data signal (402) by use of an oversampling frequency to output, in parallel, a plurality of fundamental signal series (p1, p2, p3, p4), wherein each of said plurality of fundamental signal series has the same fundamental sampling frequency (fs) but a different phase;

a delay adjustment portion for outputting a plurality of adjusted signal series, wherein the relative amount of delay for the plurality of fundamental signal series (p1, p2, p3, p4) outputted is adjusted; and a circular shifter for receiving said plurality of adjusted signal series and outputting a plurality of frequency shift signal series (pH1, pH2, pH3, pH4), wherein the frequency common to each of said plurality of frequency shift signal series is different from the fundamental sampling frequency, and each of said plurality of frequency shift signal series has a different phase;

wherein said circular shifter generates said plurality of frequency shift signal series by selecting a desired signal sample out of the received adjusted signal series according to a count value of a phase shift cumulative counter and a predetermined rule related to the frequency shift; and wherein a desired signal series is obtained by determining whether there is an error in an error detector in relation to at least one fundamental signal series and at least one frequency shift signal series.

* * * * *